UNITED STATES PATENT OFFICE.

AMOR SMITH, OF CINCINNATI, OHIO.

IMPROVEMENT IN FERTILIZERS.

Specification forming part of Letters Patent No. 77,667, dated May 5, 1868.

*To all whom it may concern:*

Be it known that I, AMOR SMITH, of Cincinnati, in the county of Hamilton and State of Ohio, have invented a new and useful Improvement in Fertilizers for use, in combination with phosphates, in manuring lands; and I do hereby declare that the following is a full, clear, and exact description of the same.

The use of the phosphates of lime, as found in bone-dust, is and has long been familiar in agriculture as a fertilizer. Other chemical ingredients are essential; among these is ammonia. To supply this, I propose to use what are known as cracklings, viz., the solid fleshy refuse remaining after extracting the fatty portions of animal matter.

I take the cracklings as they come from the lard and tallow rendering establishments, and press them in a hydraulic press until the separable fatty matters are extracted. The cakes thus compressed are then ground to a coarse powder. A machine prepared for such purpose has already been patented by me. This material is found, by analysis, to contain about (13) thirteen per cent. of ammonia, as well as other substances useful as a manure. It is not proposed to use this material alone as a manure, as in most cases it would be too expensive; but I combine it with bone-dust in such proportions as the requirements of the soil may demand. Any other phosphates besides bone-dust may be used.

I do not claim the phosphates, nor any particular combination of the same with the pulverized cracklings; but What I do claim as my invention, and desire to secure by Letters Patent, is—

As a new article of manufacture, cracklings reduced to a powder, for use, in combination with phosphates, as a fertilizer.

In testimony whereof I have signed my name to this specification in the presence of two subscribing witnesses.

AMOR SMITH.

Witnesses:
BENJ. C. TRUE,
GEO. W. CONNARY.